(12) United States Patent
Wei et al.

(10) Patent No.: US 6,831,718 B2
(45) Date of Patent: Dec. 14, 2004

(54) LIQUID CRYSTAL DISPLAY DEVICE

(75) Inventors: Chung Kuang Wei, Tainan (TW); Chen Lung Kuo, Tainan (TW)

(73) Assignee: Chi Mei Optoelectronics Corp., Tainan (TW)

(*) Notice: Subject to any disclaimer, the term of this patent is extended or adjusted under 35 U.S.C. 154(b) by 41 days.

(21) Appl. No.: 10/147,040

(22) Filed: May 17, 2002

(65) Prior Publication Data

US 2003/0133059 A1 Jul. 17, 2003

(30) Foreign Application Priority Data

Jan. 15, 2002 (TW) ........................ 91100835 A (51) Int. Cl.$^7$ .................... G02F 1/1335; F02F 1/136
(52) U.S. Cl. .................... 349/114; 349/106; 349/43
(58) Field of Search .................... 349/113–114, 106, 349/117, 43

(56) References Cited

U.S. PATENT DOCUMENTS

| | | | | |
|---|---|---|---|---|
| 6,501,521 B2 | * | 12/2002 | Matsushita et al. | 349/106 |
| 6,552,767 B1 | * | 4/2003 | Kaneko | 349/119 |
| 6,621,543 B2 | * | 9/2003 | Moon | 349/115 |
| 6,633,353 B1 | * | 10/2003 | Seki et al. | 349/113 |
| 6,654,082 B1 | * | 11/2003 | Sohda et al. | 349/106 |
| 6,680,765 B1 | * | 1/2004 | Maeda et al. | 349/117 |

* cited by examiner

Primary Examiner—Toan Ton (57) ABSTRACT

A liquid crystal display (LCD) device mainly includes a first substrate, a second substrate and a liquid crystal layer provided between the inner-surfaces of the first and the second substrates. The first substrate has a plurality of pixel regions arranged in a matrix, wherein each of the pixel regions is provided with a switching element (e.g., TFT), a reflection electrode (as an ambient light reflector) and a transmission electrode (as a backlight transmitter). The second substrate is provided with color filter elements for displaying colors and a common electrode. The LCD according to the present invention is characterized by having an extra color filter layer provided in each of the pixel regions of the first substrate for improving the color saturation in the transmissive mode.

24 Claims, 7 Drawing Sheets

LIQUID CRYSTAL DISPLAY DEVICE

BACKGROUND OF THE INVENTION

1. Field of the Invention

This invention relates to Liquid Crystal Display (LCD) and in particular to LCDs of the transflective type.

2. Description of the Related Art

LCDs can be classified according to the source of illumination. Reflective displays are illuminated by ambient light that enters the display from the front. A reflective surface, such as an aluminum or silver reflector placed in or behind the reflective display, returns light to illuminate the reflective display. Although reflective displays meet the need for low power consumption, the displays often appear rather dark and are therefore difficult to read. In addition, there are many conditions where there is insufficient ambient light, the purely reflective display is thus limited in usefulness.

In applications where the intensity of ambient light is insufficient for viewing, supplemental lighting, such as a backlight assembly, is used to illuminate the display. Although supplemental lighting can illuminate a display regardless of ambient lighting conditions, it is an expensive drain on battery life. Thus, the batteries on portable computers, for example, must typically be recharged after 2 to 4 hours of continuous backlight use. In applications where the intensity of ambient light is very strong, e.g., under an outdoor burning sun, the transmissive image illuminated only by the backlight assembly is insufficient for viewing because of poor contrast.

In an attempt to overcome the above described drawbacks of reflective and transmissive displays, some electronic displays have been designed to use ambient light when it is available and backlighting only when it is necessary. This dual function of reflection and transmission leads to the designation, "transflective". Transflective LCDs are dual mode display devices. These devices operate either with the available ambient light in a reflective mode or with an internal backlight in a transmissive mode.

Figure 1:
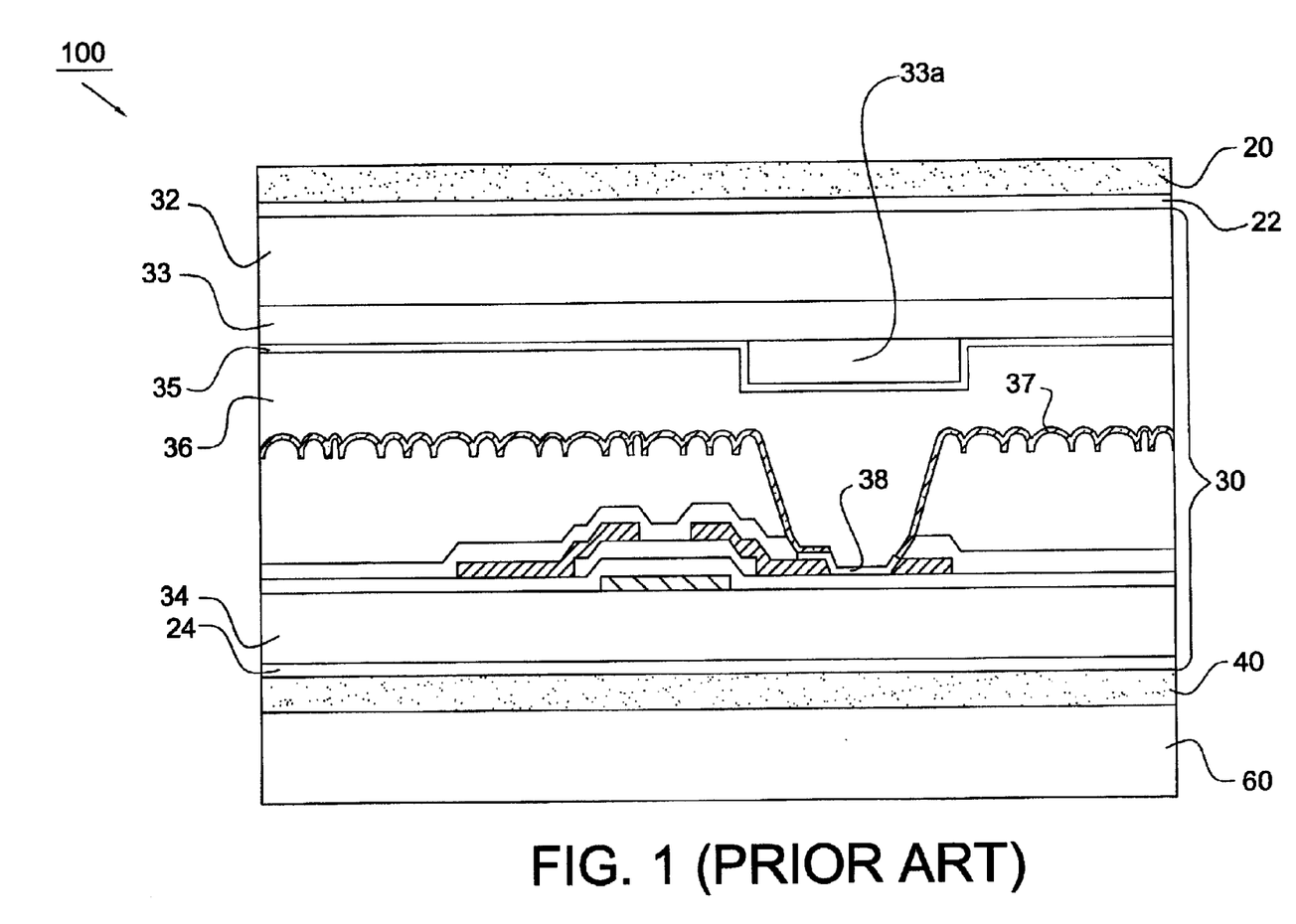
FIG. 1 is a cross sectional view of a portion of a conventional transflective LCD.

FIG. 1 illustrates a conventional transflective LCD 100 which comprises two opposing glass substrates 32 and 34 with a liquid crystal layer 36 sandwiched therebetween. Two polarizers 20 and 40 are formed on the outer surfaces of the two substrates 32 and 34. A retardation film 22 is formed between the substrate 32 and the polarizer 20, and a retardation film 24 is formed between the substrate 34 and the polarizer 40. Typically, the substrate 34 is provided with a plurality of pixel regions arranged in a matrix each with a TFT, a reflection electrode 37 (as an ambient light reflector) and a transmission electrode 38 (as a back light transmitter) which is formed at a location corresponding to the opening of the reflection electrode 37. The substrate 32 is provided with color filter elements 33 for displaying colors and a common electrode 35. While the liquid crystal layer having negative dielectric anisotropy is possible, the liquid crystal layer has the more popular positive dielectric anisotropy. Thus, when the switching element is in the "on" state or in the "off" state, the light passing through the liquid crystal layer will be altered in some way, depending upon the nature of the light and the type of LCD.

In the reflective mode, the light passes through the color filter element 33 twice; however, in the transmissive mode, the light passes through the color filter element 33 only once. Therefore, each pixel region of the conventional LCD 100 is provided an extra color filter layer 33a on the color filter element 33 of the substrate 32. This arrangement can effectively prevent degraded color saturation in the transmissive mode. However, since the extra color filter layer 33a and transmission electrode 38 are formed on the two different substrates 32 and 34, the two glass substrate 32 and 34 must be precisely aligned during assembly such that the extra color filter layer 33a can be precisely formed on the region of the color filter element 33 corresponding to the transmission electrode 38. Therefore, the manufacturing process of the conventional LCD 100 may not be easily controlled and requires precise design. Accordingly, there exists a need in the art for a transflective liquid crystal display which overcomes, or at least reduces the above-mentioned problems of the prior art.

SUMMARY OF THE INVENTION

It is a primary object of the present invention to provide a transflective LCD which has good color saturation in the transmissive mode and can be easily manufactured.

The liquid crystal display (LCD) according to the present invention primarily comprises a first substrate, a second substrate and a liquid crystal layer formed between the inner surfaces of the first and the second substrates. The first substrate is provided with a plurality of pixel regions arranged in a matrix each with a switching element (e.g., TFT), a reflection electrode (as an ambient light reflector) and a transmission electrode (as a backlight transmitter). The LCDs according to the present invention are characterized by having an extra color filter layer provided in each of the pixel regions of the first substrate for improving the color saturation in the transmissive mode.

In a general aspect of the present invention, the first substrate is provided with a plurality of gate lines formed parallel to one another, and a plurality of data lines formed parallel to one another and vertically to the gate lines. The gate lines and the data lines are arranged to form a matrix of pixel regions with each of the pixel regions bounded by two adjacent gate lines and two adjacent data lines. The switching elements are formed at intersections of the gate lines and the data lines. A passivation layer is formed on the switching elements and the data lines. The passivation layer has a plurality of contact holes. An overcoat layer is formed on the passivation layer with an uneven surface closest to the liquid crystal layer (i.e., the side of the overcoat layer adjacent to the liquid crystal layer has an uneven surface) and the overcoat layer has a plurality of cavities to expose the contact holes of the passivation layer. Preferably, two polarizers are provided on the outer surfaces of the first and second substrates. A first retardation film is provided between the first substrate and the polarizer and a second retardation film is provided between the second substrate and the polarizer.

According to one embodiment of the present invention, the reflection electrode is formed on the overcoat layer such that the surface of the reflection electrode is uneven. The reflection electrode has at least one opening corresponding to the cavity of the overcoat layer, and the transmission electrode is disposed at a location corresponding to the opening of the reflection electrode. The transmission electrode and the reflection electrode are electrically connected to each other and at least one of them is electrically connected to the switching element. It is noted that the color filter layer is formed in the cavities of the overcoat layer. In this embodiment, the second substrate is provided with color filter elements for displaying colors. In the transmissive mode, light will pass through the color filter layer in the cavities and the color filter element on the second substrate, and then arrive a viewer thereby obtaining better color saturation. It will be understood that the transmission electrode is preferably disposed between the color filter layer and the liquid crystal layer. Alternatively, the transmission electrode may be also disposed under the color filter layer. In any pixel region, the color filter element of the second substrate and the corresponding color filter layer of the first substrate have the same color.

According to another embodiment of the present invention, the overcoat layer is made of a color filter material. The reflection electrode is formed on the overcoat layer such that the surface of the reflection electrode is uneven. The reflection electrode has at least one opening formed at a location outside the region corresponding to the cavity of the overcoat layer. The reflection electrode is electrically connected to the switching element through the contact hole of the passivation layer. It is noted that there is another color filter layer being formed over the reflection electrode and filling the cavity of the overcoat layer. The color filter layer has a substantially even surface closest to the liquid crystal layer, and has at least one hole. The transmission electrode is disposed on the substantially even surface of the color filter layer and electrically connected to the reflection electrode through the hole of the color filter layer. Preferably, the hole of the color filter layer is formed at a location outside the region corresponding to the cavity of the overcoat layer. In the transmissive mode, light will pass through the color filter material of the overcoat layer and another color filter layer on the reflection electrode, and then arrive a viewer, thereby obtaining better color saturation.

According to still another embodiment of the present invention, the overcoat layer further comprises a plurality of second cavities. The reflection electrode is formed on the overcoat layer such that the surface of the reflection electrode is uneven. The reflection electrode has a first opening corresponding to the cavity of the overcoat layer exposing the contact hole of the passivation layer and a second opening corresponding to the second cavity of the overcoat layer. At least a portion of the reflection electrode is electrically connected to the switching element through the contact hole of the passivation layer. It is noted that the color filter layer is formed on the reflection electrode and fills the cavities of the overcoat layer. The color filter layer has a substantially even surface closest to the liquid crystal layer, and has at least one hole. The transmission electrode is formed on the substantially even surface of the color filter layer and electrically connected to the reflection electrode through the hole of the color filter layer. Preferably, the hole of the color filter layer is formed at a location outside the region corresponding to the cavities of the overcoat layer. In the transmissive mode, light will pass through the color filter layer filling the cavities of the overcoat layer and then arrive a viewer, thereby obtaining a better color saturation.

According to still another embodiment of the present invention, the color filter layer is substituted for the overcoat layer and formed on the passivation layer. The color filter layer has an uneven surface closest to the liquid crystal layer and has a plurality of cavities to expose the contact holes of the passivation layer. The transmission electrode is provided on the color filter layer and electrically connected to the switching element through the contact hole of the passivation layer. The reflection electrode is provided on the transmission electrode such that the surface of the reflection electrode is uneven. The reflection electrode has at least one opening formed at a location outside the region corresponding to the cavity of the overcoat layer. In this embodiment, the second substrate is provided with color filter elements for displaying colors. In the transmissive mode, light will pass through the color filter layer on the passivation layer and the color filter element on the second substrate, and then arrive a viewer, thereby obtaining a better color saturation. In any pixel region, the color filter element of the second substrate and the corresponding color filter layer of the first substrate have the same color.

BRIEF DESCRIPTION OF THE DRAWINGS

Other objects, advantages, and novel features of the invention will become more apparent from the following detailed description when taken in conjunction with the accompanying drawings.

DESCRIPTION OF THE PREFERRED EMBODIMENT

FIGS. 2–6 illustrate the transflective LCDs according to the embodiments of the present invention, and similar components have been given the same reference numerals. These LCDs mainly include a first substrate 210, a second substrate 220 and a liquid crystal layer 230 provided between the inner surfaces of the two substrates 210 and 220. The first substrate 210 is provided with a plurality of pixel regions arranged in a matrix. Each pixel region is provided with a thin film transistor (TFT) as a switching element, a reflection electrode 212 and a transmission electrode 216 wherein the light from the backlight can pass through the transmission electrode 216 in the transmissive mode, and the ambient light can be reflected by the reflection electrode 212 in the reflective mode. The LCDs according to the present invention are characterized by having an extra color filter layer 211 provided in each of the pixel regions of the first substrate 210 for improving the color saturation in the transmissive mode.

Preferably, the reflection electrode 212 is made of a material having a high light reflection efficiency, and the transmission electrode 216 is made of a material having a high light transmission efficiency. More preferably, the reflection electrode 212 is made of aluminum or silver, and the transmission electrode 216 is made of ITO. The TFT comprises a gate electrode 232a, a semiconductor layer 239 and source/drain electrodes 234a, 234b. A passivation layer 237 is provided on the TFT and the data lines. The passivation layer 237 has a plurality of contact holes 237a. An overcoat layer 295 is formed on the passivation layer 237 such that the overcoat layer has an uneven surface closest to the liquid crystal layer 230. The overcoat layer 295 includes a plurality of cavities 295a to expose the contact holes 237a of the passivation layer. As shown, the uneven surface of the overcoat layer 295 preferably has some fine corrugated (concave or convex) portions in order to increase the reflection rate in directions other than the angle of mirror reflection. Alternatively, the overcoat layer 295 may be provided with slanted micro prism array (not shown) acting as the uneven surface.

The outer surfaces of the two substrates 210 and 220 are provided with two polarizers 260 and 270 which polarize the visible light. One retardation film 280 is provided between the polarizer 260 and the substrate 220, and the other retardation film 282 is provided between the polarizer 270 and the substrate 210. The retardation film 280 typically comprises an achromatic λ/4 retardation film. The retardation film 282 typically comprises a phase retardation film for compensating the light phase during transmission thereby raising the contrast or lightness of the transmission area. A backlight 290 (e.g., a backlight module) is provided behind the two substrates 210 and 220. The typical backlight module includes an optical cavity and a lamp, LED or other structure that generates light.

Figure 7:
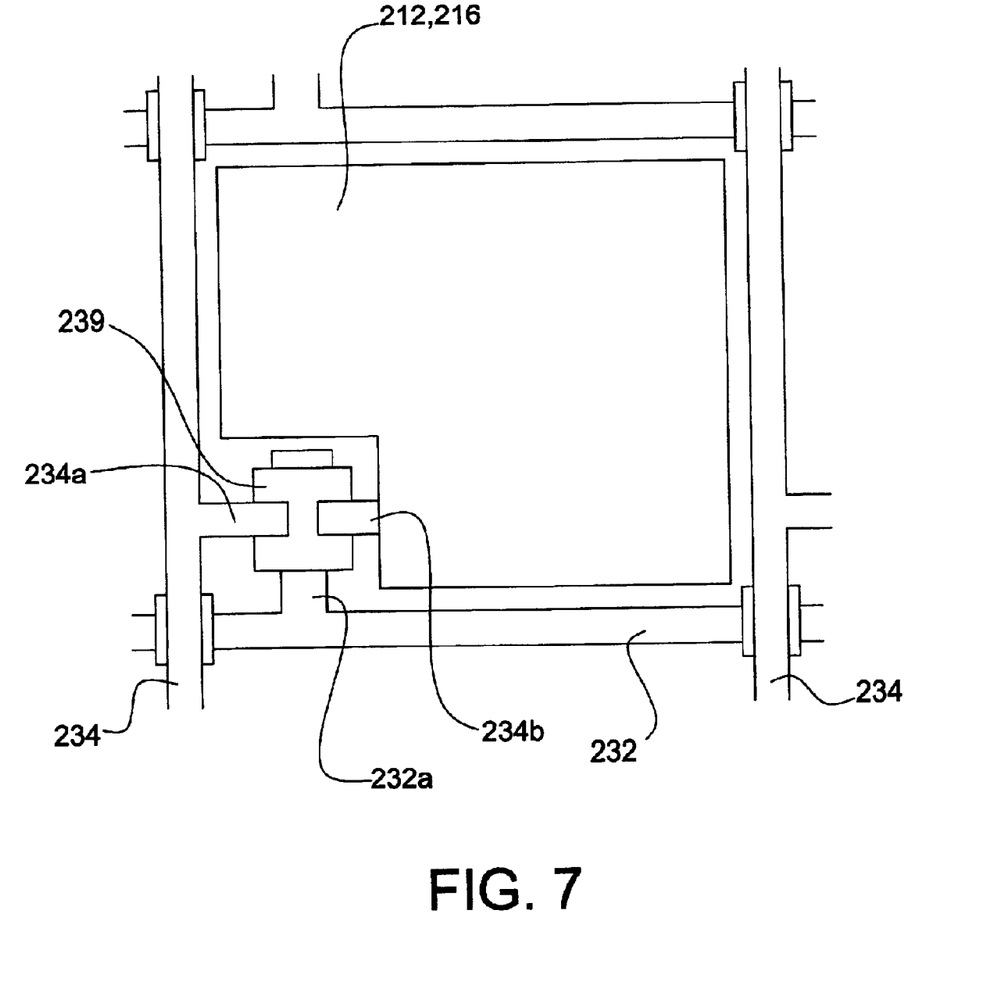
FIG. 7 is a top plan view of a pixel region according to one embodiment of the present invention.

Referring to FIG. 7, a plurality of parallel gate lines 232 and a plurality of parallel data lines 234 perpendicular to the gate lines 232 are formed on the first substrate 210. The pixel region described above is a region which is surrounded by two adjacent gate lines 232 and two adjacent data lines 234. These gate lines 232 and data lines 234 are insulated from each other by an inter-layer insulating film. When a scanning signal is fed to the gate line 232, the thin film transistor is turned on to feed the data signal therethrough to the reflection electrode 212 and transmission electrode 216.

Figure 2:
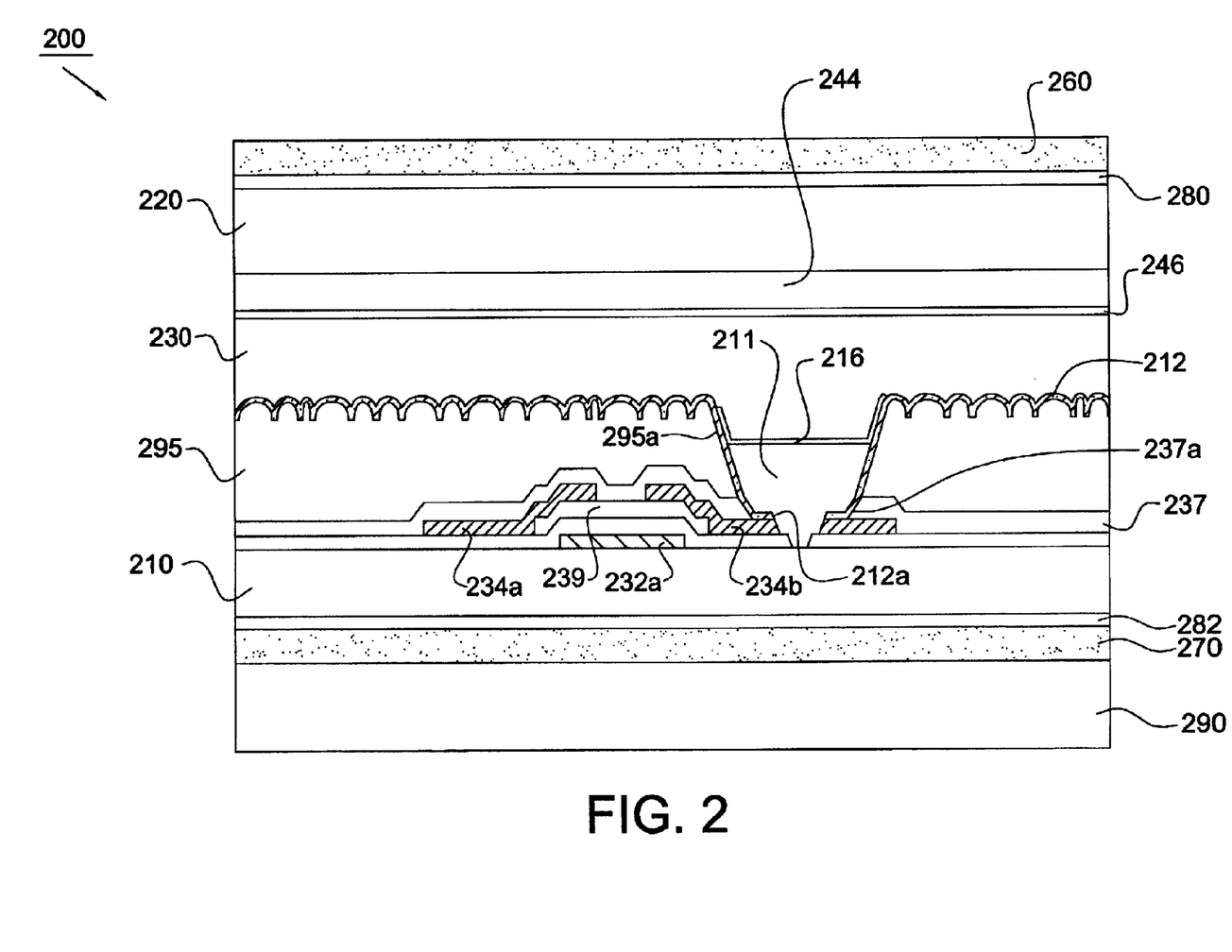
FIG. 2 is a cross sectional view of a portion of a transflective LCD according to a first embodiment of the present invention.

FIG. 2 illustrates a transflective LCD 200 according to a first embodiment of the present invention. In this embodiment, the reflection electrode 212 is formed on the corrugated surface of the overcoat layer 295 such that the surface of the reflection electrode is provided with the corrugated surface acting as a reflective surface. The reflection electrode 212 has a plurality of openings 212a corresponding to the cavities 295a of the overcoat layer 295. It is noted that the LCD 200 is characterized in that the color filter layer 211 is formed in the cavity 295a of the overcoat 295. The transmission electrode 216 is disposed between the color filter layer 211 and the liquid crystal layer 230. The transmission electrode 216 and the reflection electrode 212 are electrically connected to each other and a portion of the reflection electrode is electrically connected to the drain electrode 234b of the TFT through the contact hole 237a of the passivation layer. The second substrate 220 is provided with color filter elements 244 for displaying colors and a transparent electrode 246 such as an ITO electrode as a common electrode. It can be understood that, in any pixel region, the color filter element 244 of the second substrate 244 and the corresponding color filter layer 211 of the first substrate have the same color. Therefore, in the transmissive mode, light will pass through the color filter layer 211 in the cavity 295a and the color filter element 244 on the second substrate 220, and then arrive a viewer thereby obtaining a better color saturation.

Figure 3:
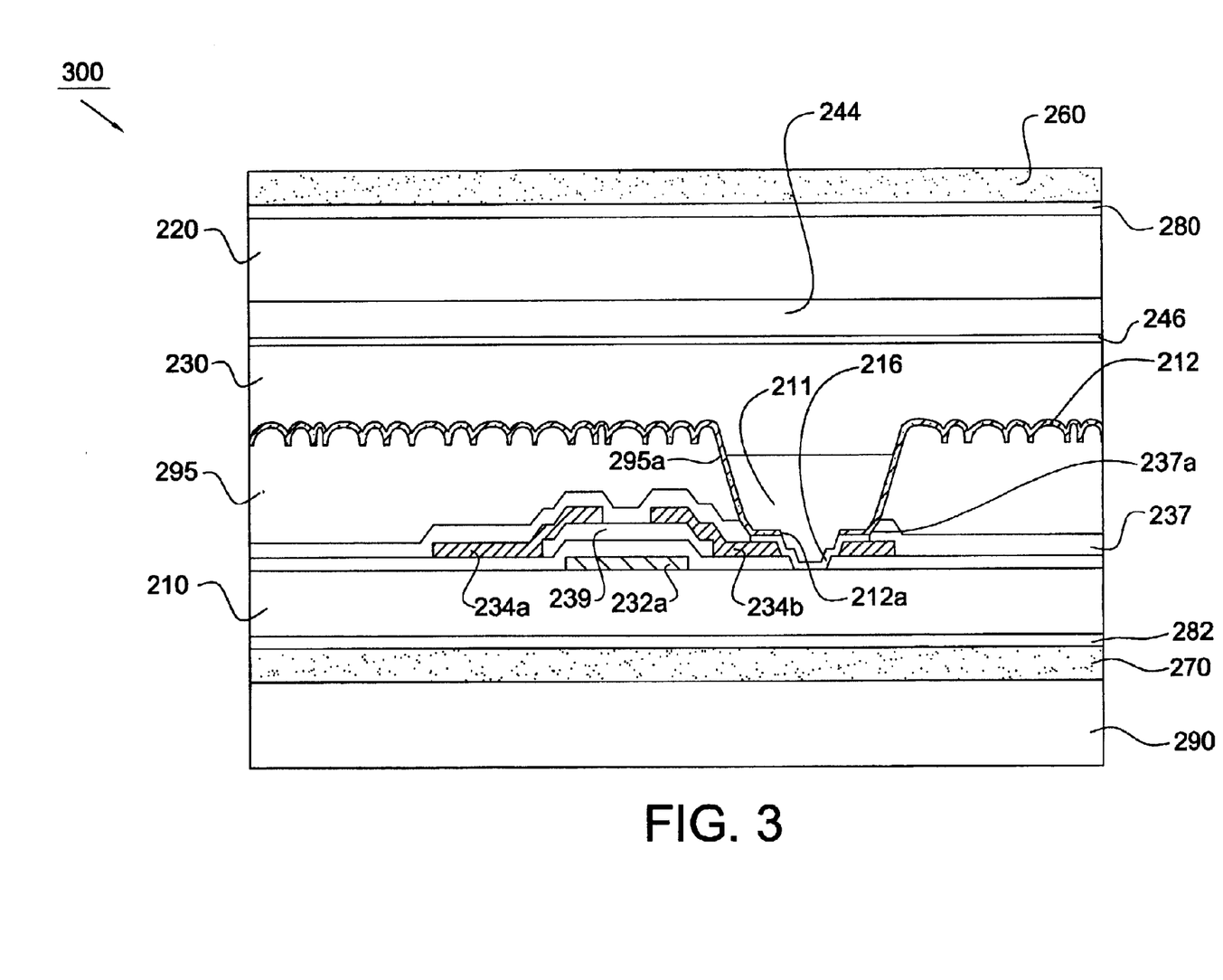
FIG. 3 is a cross sectional view of a portion of a transflective LCD according to a second embodiment of the present invention.

FIG. 3 shows a transflective LCD 300 according to a second embodiment of the present invention. The LCD 300 is substantially identical to the LCD 200 of FIG. 2 with an exception that the transmission electrode 216 is provided under the color filter layer 211. In this embodiment, the transmission electrode 216 has a portion directly connected to the drain electrode 234b of the TFT, and the reflection electrode 212 is electrically connected to the TFT through the transmission electrode 216.

Figure 4:
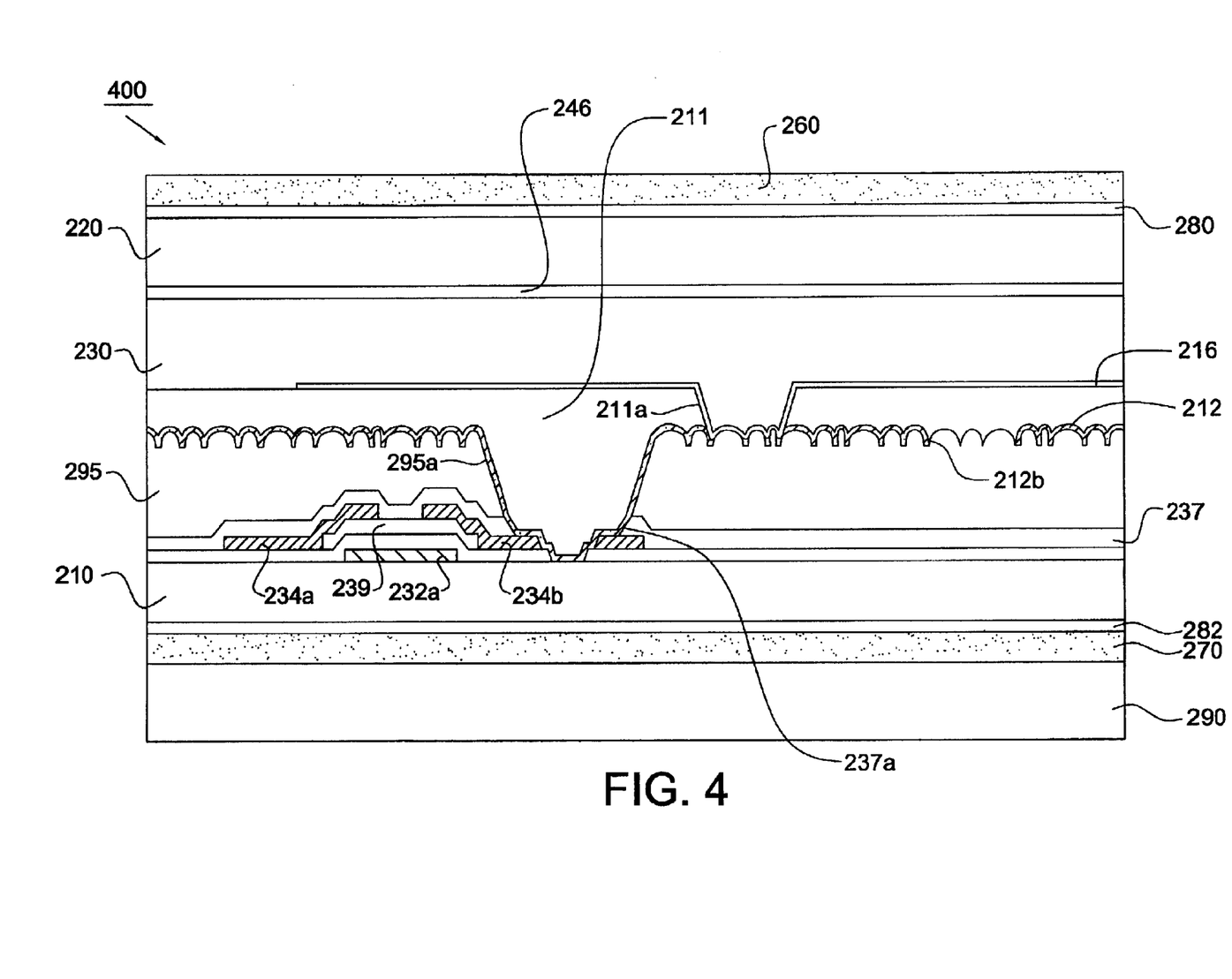
FIG. 4 is a cross sectional view of a portion of a transflective LCD according to a third embodiment of the present invention.

FIG. 4 shows a transflective LCD 400 according to a third embodiment of the present invention. In this embodiment, the reflection electrode 212 is formed on the overcoat layer 295 such that the surface of the reflection electrode is uneven. The reflection electrode 212 has a plurality of openings 212b. Preferably, the openings 212b are formed at a location outside the regions corresponding to the cavities 295a of the overcoat layer. The reflection electrode 212 is electrically connected to the drain electrode 234b of the TFT through the contact hole 237a of the passivation layer 237. In this embodiment, the overcoat layer 295 is made of a color filter material, and the color filter layer 211 is formed over the reflection electrode 212 and fills the cavity 295a of the overcoat layer 295. The color filter layer 211 has a substantially even surface closest to the liquid crystal layer 230, and has a plurality of holes 211 a. The transmission electrode 216 is disposed on the substantially even surface of the color filter layer 211 and electrically connected to the reflection electrode 212 through the hole 211a of the color filter layer. Preferably, the hole 211a of the color filter layer is formed at a location outside the region corresponding to the cavity 295a of the overcoat layer. It is noted that the second substrate 220 doesn't have any color filter element. Therefore, in the reflection mode, light will pass through the color filter layer on the reflection electrode twice, and then arrive a viewer. In the transmissive mode, light will pass through the color filter material of the overcoat layer 295 and the color filter layer 211 on the reflection electrode, and then arrive a viewer, thereby obtaining a better color saturation.

Figure 5:
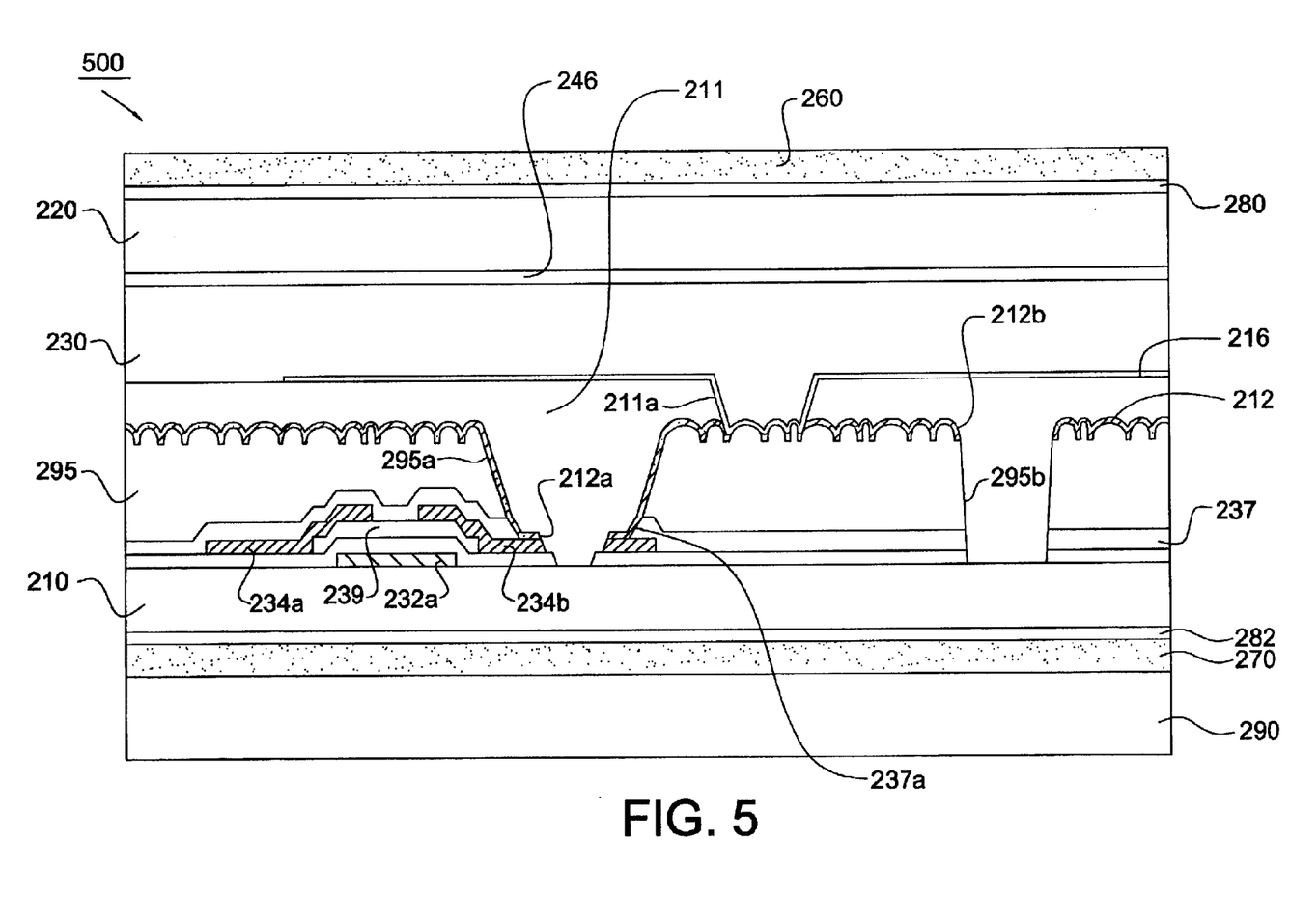
FIG. 5 is a cross sectional view of a portion of a transflective LCD according to a fourth embodiment of the present invention.

FIG. 5 shows a transflective LCD 500 according to a fourth embodiment of the present invention. In this embodiment, the overcoat layer 295 further comprises a plurality of cavities 295b. The reflection electrode 212 has a plurality of openings 212a corresponding to the cavities 295a of the overcoat layer 295 and a plurality of openings 212b corresponding to the cavities 295b of the overcoat layer. At least a portion of the reflection electrode 212 is electrically connected to the drain electrode 234b of the TFT through the contact hole 237a of the passivation layer 237. It is noted that the color filter layer 211 is formed over the reflection electrodes 212 and fills the cavities 295a and 295b of the overcoat layer 295. The transmission electrode 216 is formed on the substantially even surface of the overcoat layer 211 and electrically connected to the reflection electrode 212 through the hole 211a of the color filter layer. It is noted that the second substrate 220 doesn't have any color filter element. Therefore, in the reflection mode, light will pass through the color filter layer 211 on the reflection electrode twice, and then arrive a viewer. In the transmissive mode, light will pass through the color filter layer filling the cavities 295a and 295b of the overcoat layer 295, and then arrive a viewer, thereby obtaining a better color saturation.

Figure 6:
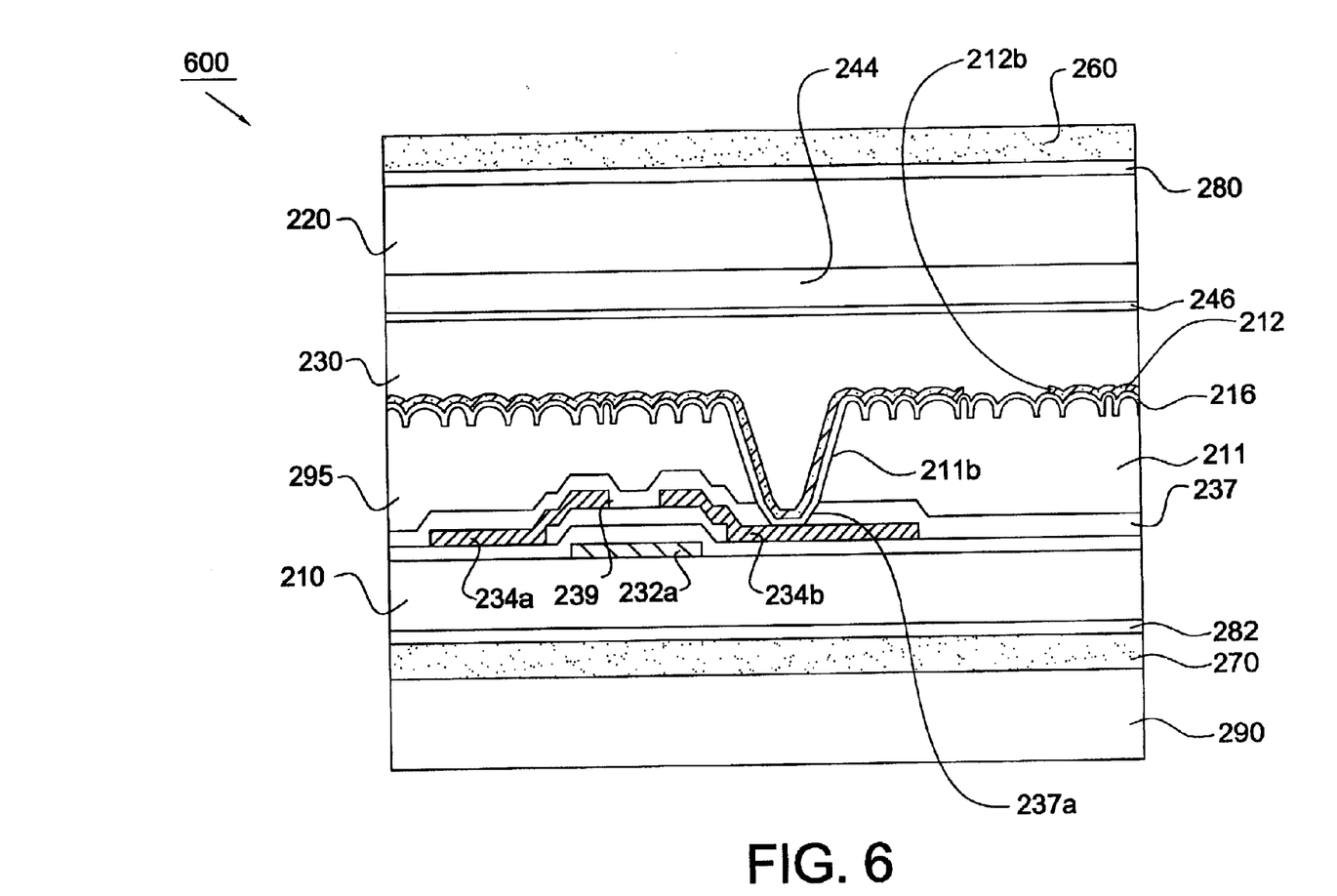
FIG. 6 is a cross sectional view of a portion of a transflective LCD according to a fifth embodiment of the present invention.

FIG. 6 shows a transflective LCD 600 according to a fifth embodiment of the present invention. The LCD 600 is characterized in that the color filter layer 211 is substituted for the overcoat layer and formed on the passivation layer 237. The color filter layer 211 has an uneven surface closest to the liquid crystal layer 230 and has a plurality of cavities 211b to expose the contact holes 237a of the passivation layer. The transmission electrode 216 is formed on the color filter layer 211 and electrically connected to the drain electrode 234b of the TFT through the contact hole 237a of the passivation layer. The reflection electrode 212 is formed on the transmission electrode 216 such that the surface of the reflection electrode 212 is uneven. The reflection electrode has a plurality of openings formed outside the region corresponding to the cavity 211b of the color filter layer. The second substrate 220 is provided with color filter elements 244 for displaying colors and a transparent electrode 246 such as an ITO electrode as a common electrode. It can be understood that, in any pixel region, the color filter element 244 of the second substrate and the corresponding color filter layer 211 of the first substrate have the same color. Therefore, in the transmissive mode, light will pass through the color filter layer 211 on the passivation layer, the opening 212b of the reflection electrode and the color filter element 244 on the second substrate 220, and then arrive a viewer, thereby obtaining a better color saturation.

In the transflective LCDs according to the present invention, each pixel region of the first substrate 210 is provided with an extra color filter layer 211. In the first, second and fifth embodiments, under the transmissive mode, the light from the backlight not only passes the color filter element 244 on the second substrate but also passes the extra color filter layer 211 on the first substrate thereby enhancing the color saturation seen by the viewer. In the third and fourth embodiments, under the transmissive mode, the light from the backlight not only passes the color filter layer on the reflection electrode, but also passes the color filter layer under the reflection electrode thereby enhancing the color saturation seen by the viewer. Furthermore, the extra color filter layer 211 and the transmission electrode 216 are provided on the same substrate such that the color filter layer 211 and the transmission electrode 216 can be easily form on the predetermined location of the substrate. Accordingly, the precision of assembling the two substrates is not required to be controlled as strictly as that in the prior art thereby materially increasing yields.

Although the invention has been explained in relation to its embodiment, it is to be understood that many other possible modifications and variations can be made without departing from the spirit and scope of the invention as hereinafter claimed.

What is claimed is:

1. A liquid crystal display device comprising:
   a first substrate, a second substrate, and a liquid crystal layer provided between inner surfaces of the first and the second substrates, the first substrate having a plurality of pixel regions arranged in a matrix and a plurality of switching elements, each of the pixel regions including a reflective region for performing display using reflected light and a transmissive region for performing display using transmitted light;
   a reflection electrode in the reflective region of each pixel region, the reflection electrode being formed on the first substrate;
   a transmission electrode formed at a location corresponding to the transmissive region of each pixel region, the transmission electrode and the reflection electrode being electrically connected to each other, at least one of the transmission electrode and the reflection electrode being electrically connected to the switching element; and
   at least a first color filter layer;
   wherein the liquid crystal layer and said first color filter layer are separated by the transmission electrode.

2. The liquid crystal display device as claimed in claim 1, further comprising:
   a passivation layer being provided on the first substrate and covering the switching elements, the passivation layer having a plurality of contact holes;
   an overcoat layer on the passivation layer, the overcoat layer having a plurality of cavities to expose the contact holes of the passivation layer,
   wherein the reflection electrode is formed on the overcoat layer and has at least one opening corresponding to the cavity of the overcoat layer,
   the transmission electrode is formed at a location corresponding to the opening of the reflection electrode, and
   the first color filter layer is formed in the cavities of the overcoat layer and on the reflection electrode.

3. The liquid crystal display device as claimed in claim 2, wherein the transmission electrode is provided between the first color filter layer and the liquid crystal layer.

4. The liquid crystal display device as claimed in claim 2, wherein the switching element is a thin-film transistor (TFT) comprising a gate electrode, a semiconductor layer, a source electrode and a drain electrode, and the transmission electrode is provided over the first color filter layer.

5. The liquid crystal display device as claimed in claim 2 further comprising:
   a plurality of color filter elements on the second substrate; and
   a common electrode,
   wherein, in any pixel region, the first color filter layer of the first substrate and the corresponding color filter element of the second substrate have the same color.

6. The liquid crystal display device as claimed in claim 2, wherein the overcoat layer has an uneven surface closest to the liquid crystal layer, and the reflection electrode has a corresponding uneven surface.

7. The liquid crystal display device as claimed in claim 2, further comprising two polarizers on outer surfaces of the first and the second substrates, a first retardation film provided between the first substrate and the polarizer, and a second retardation film provided between the second substrate and the polarizer.

8. The liquid crystal display device as claimed in claim 7, wherein the first retardation film includes a phase retardation film.

9. The liquid crystal display device as claimed in claim 7, wherein the second retardation film includes an achromatic λ4 retardation film.

10. The liquid crystal display device as claimed in claim 1, further comprising:
    a passivation layer being provided on the first substrate and covering the switching elements, the passivation layer having a plurality of contact holes; and
    at least a second color filter layer formed on each switching element on the first substrate,
    wherein the first color filter layer is formed on the passivation layer and has a plurality of cavities to expose the contact holes of the passivation layer,
    the reflection electrode is provided on the first color filter layer and has at least one opening, the reflection electrode has at least a portion electrically connected to the switching element through the contact hole of the passivation layer,
    the second color filter layer being formed over the reflection electrode and fills the cavities of the first color filter layer, the second color filter layer having at least one hole, and
    the transmission electrode is provided on the second color filter layer and electrically connected to the reflection electrode through the hole of the second color filter layer.

11. The liquid crystal display device as claimed in claim 10, wherein the opening of the reflection electrode is formed at a location outside the region corresponding to the cavity of the first color filter layer.

12. The liquid crystal display device as claimed in claim 10, wherein the hole of the second color filter layer is formed at a location outside the region corresponding to the cavity of the first color filter layer.

13. The liquid crystal display device as claimed in claim 10, wherein the first color filter layer has an uneven surface closest to the liquid crystal layer, and the reflection electrode has a corresponding uneven surface.

14. The liquid crystal display device as claimed in claim 10, further comprising two polarizers provided on outer surfaces of the first and the second substrates, a first retardation film provided between the first substrate and the polarizer, and a second retardation film provided between the second substrate and the polarizer.

15. The liquid crystal display device as claimed in claim 1, further comprising:
   a passivation layer being provided on the first substrate and covering the switching elements, the passivation layer having a plurality of contact holes,
   wherein the first color filter layer has a plurality of cavities to expose the contact holes of the passivation layer and is provided on the passivation layer,
   the transmission electrode is provided on the color filter layer and electrically connected to the switching elements through the contact hole of the passivation layer; and
   the reflection electrode is provided on the transmission electrode and has at least one opening formed at a location outside a region corresponding to the cavity of the first color filter layer.

16. The liquid crystal display device as claimed in claim 15, further comprising:
   a plurality of color filter elements on the second substrate; and
   a common electrode,
   wherein, in any pixel region, the color filter element of the second substrate and the corresponding first color filter layer of the first substrate have the same color.

17. The liquid crystal display device claimed in claim 15, further comprising two polarizers provided on outer surfaces of the first and the second substrates, a first retardation film provided between the first substrate and the polarizer, and a second retardation film provided between the second substrate and the polarizer.

18. The liquid crystal display device as claimed in claim 15, wherein the first color filter layer has an uneven surface closest to the liquid crystal layer, and the reflection electrode has an corresponding uneven surface.

19. A liquid crystal display device comprising:
   a first substrate, a second substrate, and a liquid crystal layer provided between inner surfaces of the first and the second substrates, the first substrate having a plurality of pixel regions arranged in a matrix and a plurality of switching elements;
   a passivation layer being provided on the first substrate and covering the switching elements, the passivation layer having a plurality of contact holes;
   an overcoat layer provided on the passivation layer, the overcoat layer having a plurality of first cavities to expose the contact holes of the passivation layer and a plurality of second cavities;
   a reflection electrode in each of the pixel regions, the reflection electrode being provided on the overcoat layer and having a first opening formed at a location corresponding to the first cavity of the overcoat layer and a second opening formed at a location corresponding to the second cavity of the overcoat layer, the reflection electrode having at least a portion electrically connected to the switching elements through the contact hole of the passivation layer;
   a color filter layer in each of the pixel regions, the color filter layer being formed over the reflection electrode, filling the first cavity and the second cavity of the overcoat layer, and having at least one hole; and
   a transmission electrode in each of the pixel regions, wherein the transmission electrode is provided on the color filter layer and electrically connected to the reflection electrode through the hole of the color filter layer.

20. The liquid crystal display device as claimed in claim 19, further comprising two polarizers on outer surfaces of the first and the second substrates, a first retardation film provided between the first substrate and the polarizer, and a second retardation film provided between the second substrate and the polarizer.

21. The liquid crystal display device as claimed in claim 19, wherein the overcoat layer has an uneven surface closest to the liquid crystal layer, and the reflection electrode has a corresponding uneven surface.

22. A liquid crystal display device comprising:
   a first substrate, a second substrate, and a liquid crystal layer provided between inner surfaces of the first and the second substrates, the first substrate having a plurality of pixel regions arranged in a matrix and a plurality of switching elements, each of the pixel regions including a reflective region for performing display using reflected light and a transmissive region for performing display using transmitted light;
   a reflection electrode in the reflective region of each pixel region, the reflection electrode being formed on the first substrate;
   a transmission electrode formed at a location corresponding to the transmissive region of each pixel region, the transmission electrode and the reflection electrode being electrically connected to each other, at least one of the transmission electrode and the reflection electrode being electrically connected to the switching element; and
   at least a first color filter layer formed on each switching element on the first substrate;
   wherein the thickness of the first color filter layer corresponding to the transmissive region is thicker than the thickness of the first color filter layer corresponding to the reflective region.

23. The liquid crystal display device as claimed in claim 22, wherein the first color filter layer is only formed at a location corresponding to the transmissive region.

24. The liquid crystal display device as claimed in claim 1, wherein said first color filter layer is sandwiched between the reflection electrode and the transmission electrode.

* * * * *